United States Patent
Pao-Hsi et al.

(10) Patent No.: US 6,780,487 B2
(45) Date of Patent: Aug. 24, 2004

(54) ELASTIC PAD

(76) Inventors: Lee Pao-Hsi, No. 7, Lane 226-12, Fentsau Rd., Tsautuen Jen, Nantov (TW); Yaw Jyh-Liang, No. 560, Fubei Rd., Hemei Jen, Changhua (TW)

( * ) Notice: Subject to any disclaimer, the term of this patent is extended or adjusted under 35 U.S.C. 154(b) by 134 days.

(21) Appl. No.: 10/124,032

(22) Filed: Apr. 15, 2002

(65) Prior Publication Data

US 2003/0194527 A1 Oct. 16, 2003

(51) Int. Cl.[7] .................................................. B32B 3/06
(52) U.S. Cl. .................... 428/64.1; 428/66.6; 428/66.7; 428/131; 428/134; 428/137; 428/138; 428/139; 428/223; 428/80; 428/101; 428/76
(58) Field of Search ...................... 428/66.6, 64.1–66.7, 428/131–140, 223, 80, 101, 76

(56) References Cited

U.S. PATENT DOCUMENTS 3,908,054 A * 9/1975 Ito ............................. 428/66.4
5,725,931 A * 3/1998 Landin et al. ............... 428/134

* cited by examiner

*Primary Examiner*—Elizabeth M. Cole
(74) *Attorney, Agent, or Firm*—W. Wayne Liauh

(57) ABSTRACT

An elastic pad is formed of a protective covering, and an elastic member which is encased by the protective covering and is formed of three elastic bodies capable of expanding and springing back to their original shapes. One of the three elastic bodies is sandwiched between other two of the three elastic bodes, so as to provide the elastic pad with a good quality of elasticity.

4 Claims, 6 Drawing Sheets

ELASTIC PAD

FIELD OF THE INVENTION

The present invention relates to a pad which is stuffed with an elastic body to provide protection against friction, pressure, shock, and the like.

BACKGROUND OF THE INVENTION

As shown in FIG. 1, an elastic pad 1 of the prior art is made of a casing 11 and an elastic block 12 of a rubber material. The elastic block 12 is confined by a support frame 13 of a rigid material. The prior art elastic pad 1 is defective in design in that the elastic block 12 is relatively poor at rebounding, and that the rigid support frame 13 undermines the softness of the elastic pad 1.

As shown in FIG. 2, another prior art elastic pad 2 is made of a casing 21, and an elastic member 22 which is encased by the casing 21 and is provided with a plurality of carrying seats 23 for holding a spring 24 in conjunction with a spring holder 25. The springs 24 are confined by a support frame 26. The springs 24 serve to enhance the elasticity of the prior art elastic pad 2. The metal springs 24 give an added weight to the prior art elastic pad 2. In addition, the metal springs 24 are not uniformly distributed in the inside of the casing 21, thereby compromising the elastic quality of the prior art elastic pad 2. The metal springs 24 and the support frame 26 tend to undermine the quality of softness of the prior art elastic pad 2. The elastic member 22 is complicated in construction and is therefore not cost-effective. For example, it is time-consuming to assemble the spring holders 25 of the elastic member 22.

SUMMARY OF THE INVENTION

The primary objective of the present invention is to provide an elastic pad free of the drawbacks of the prior art elastic pads described above.

In keeping with the principle of the present invention, the foregoing objective of the present invention is attained by an elastic pad which is formed of a protective covering and an elastic member. The elastic member is encased by the protective covering and is formed of a first elastic body, a second elastic body, and a third elastic body symmetrical to the second elastic body. The first elastic body is sandwiched between the second and the third elastic bodies such that the second and the third elastic bodies are retained by the first elastic body. The first elastic body is provided in the fringe with one or more retaining through slots for retaining the second and the third elastic bodies. The three elastic bodies expand and contract together to provide the elastic pad with an excellent quality of elasticity. The first elastic body is of a flat construction. The second and the third elastic bodies are shaped like a mushroom cap, or starfish with a plurality of arms. The arms are provided with a retaining portion to engage with the retaining through slots of the first elastic body.

The protective covering is provided in the inner wall with a frame for confining the elastic member.

The features and the advantages of the present invention will be more readily understood upon a thoughtful deliberation of the following detailed description of the present invention with reference to the accompanying drawings.

DETAILED DESCRIPTION OF THE INVENTION

Figure 1:
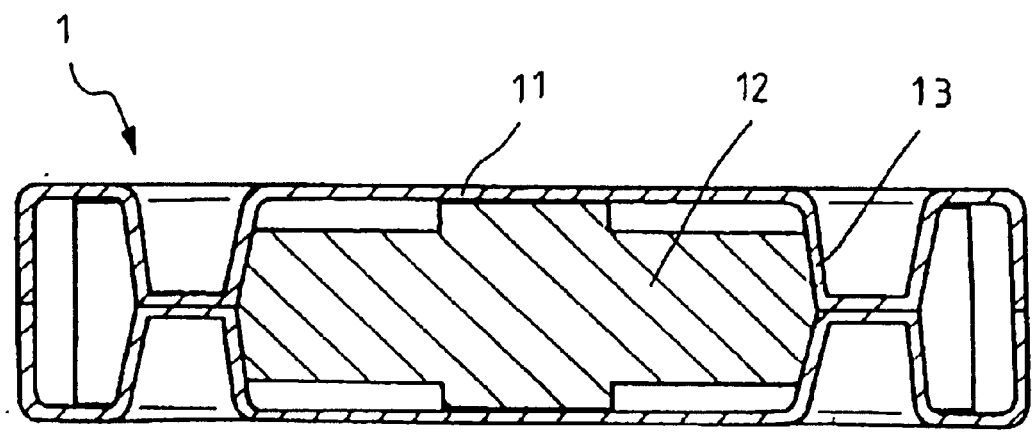
FIG. 1 shows a sectional schematic view of a prior art elastic pad.
Figure 2:
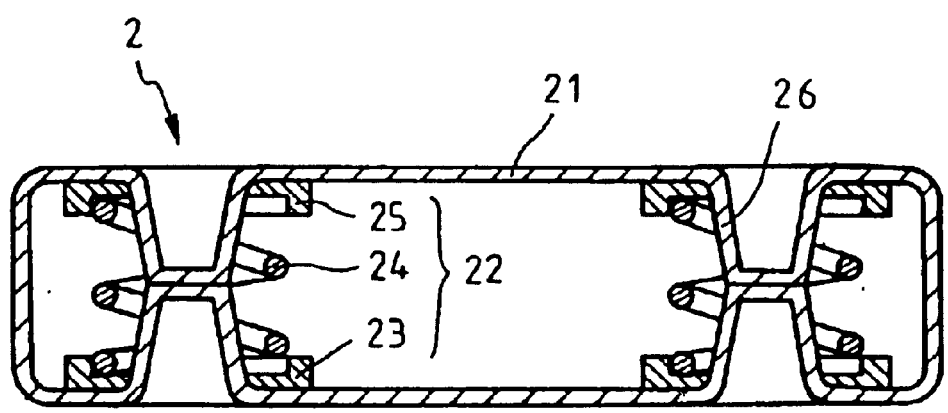
FIG. 2 shows a sectional schematic view of another prior art elastic pad.
Figure 3:
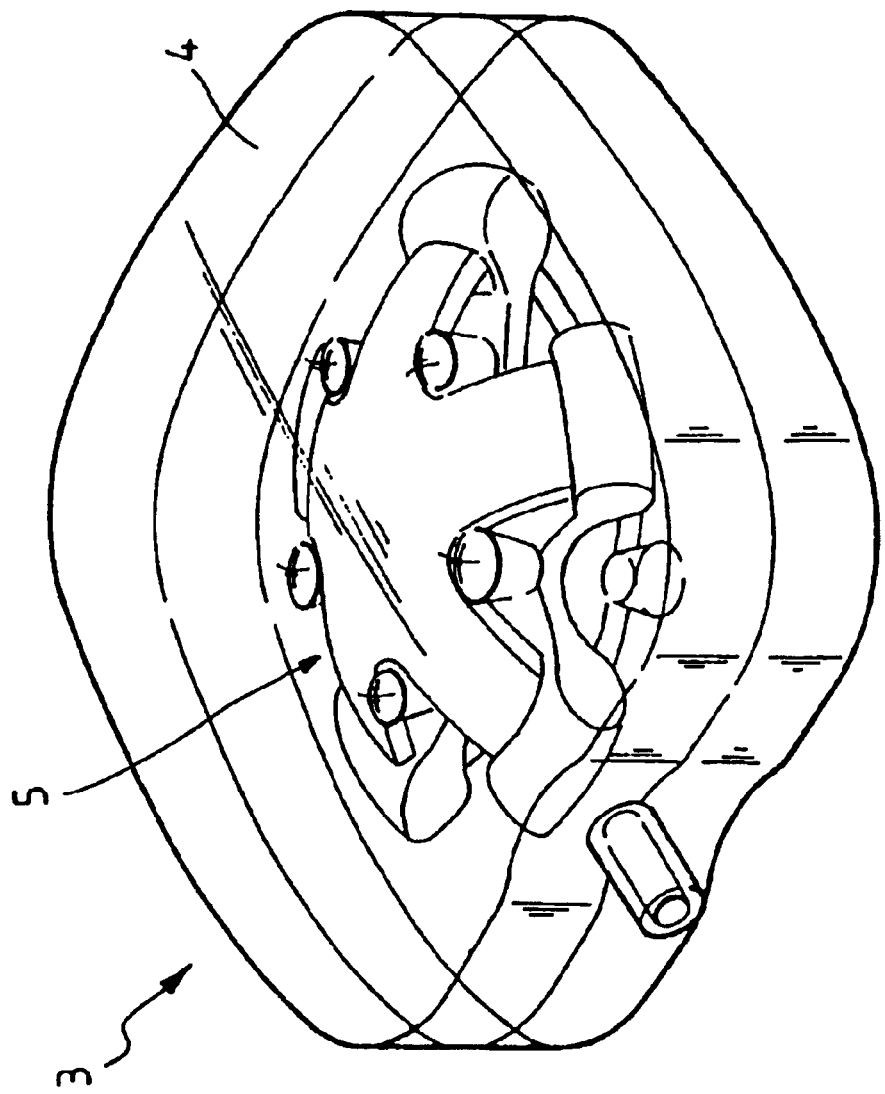
FIG. 3 shows a perspective view of the present invention.
Figure 4:
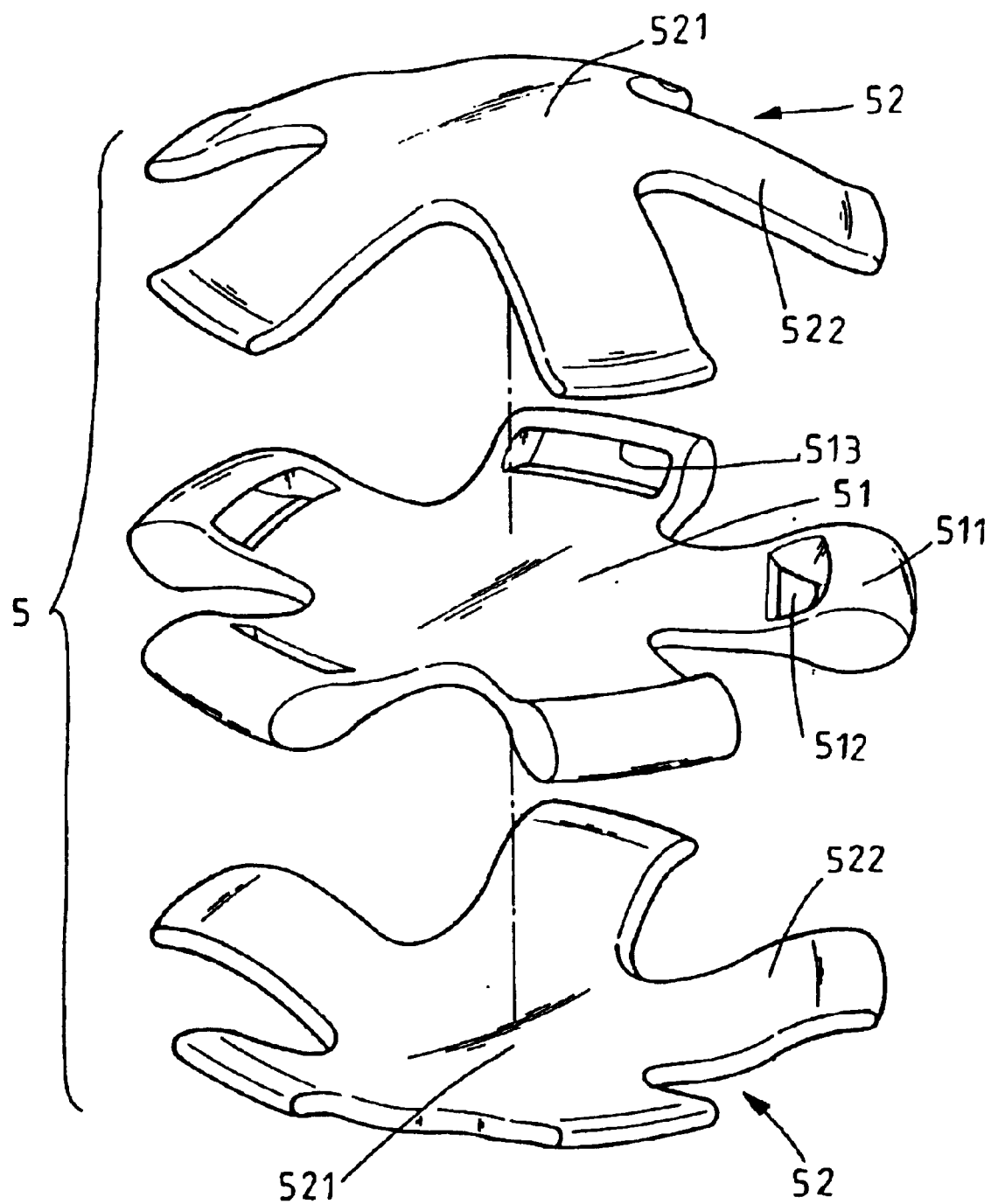
FIG. 4 shows an exploded view of an elastic member of the present invention.
Figure 5:
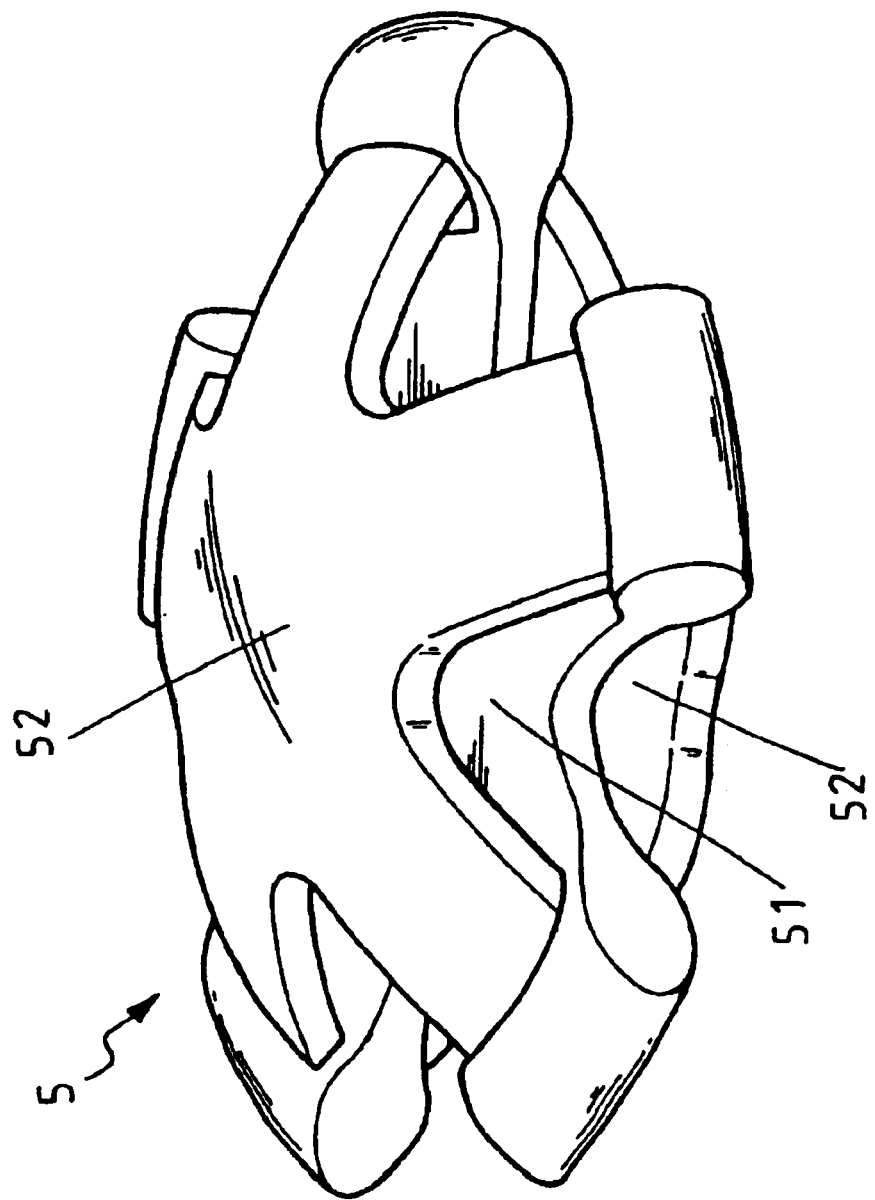
FIG. 5 shows a perspective view of the elastic member of the present invention in combination.

As shown in FIGS. 3–6, an elastic pad 3 of the present invention comprises a protective covering 4 and an elastic member 5 which is encased by the protective covering 4.

The elastic pad 3 of the present invention is characterized by the elastic member 5 which is formed of a first elastic body 51 and two second elastic bodies 52 sandwiching the first elastic body 51. The first elastic body 51 is a flat body with a plurality of arms 511 radiating from the center thereof. The arms 511 are provided at the free end with a retaining portion 512. The retaining portions 512 of the arms 511 of the embodiment of the present invention are through slots 512. The through slots 512 are preferably provided with two retaining surfaces 513 opposite to each other. The two second elastic bodies 52 are symmetrical to each other and have a starfish shape. The second elastic bodies 52 have a plurality of arms 522 radiating from a center 521 thereof. The arms 522 of the second elastic bodies 52 are corresponding in location and number to the arms 511 of the first elastic body 51. The first elastic bodies 51 is sandwiched between the two second elastic bodies 52 such that the free ends of the arms 522 of the second elastic bodies 52 are received in the through slots 512 of the arms 511 of the first elastic body 51. The retaining surfaces 513 of the through slots 512 serve to retain the free ends of the arms 522 of the second elastic bodies 52.

Figure 6:
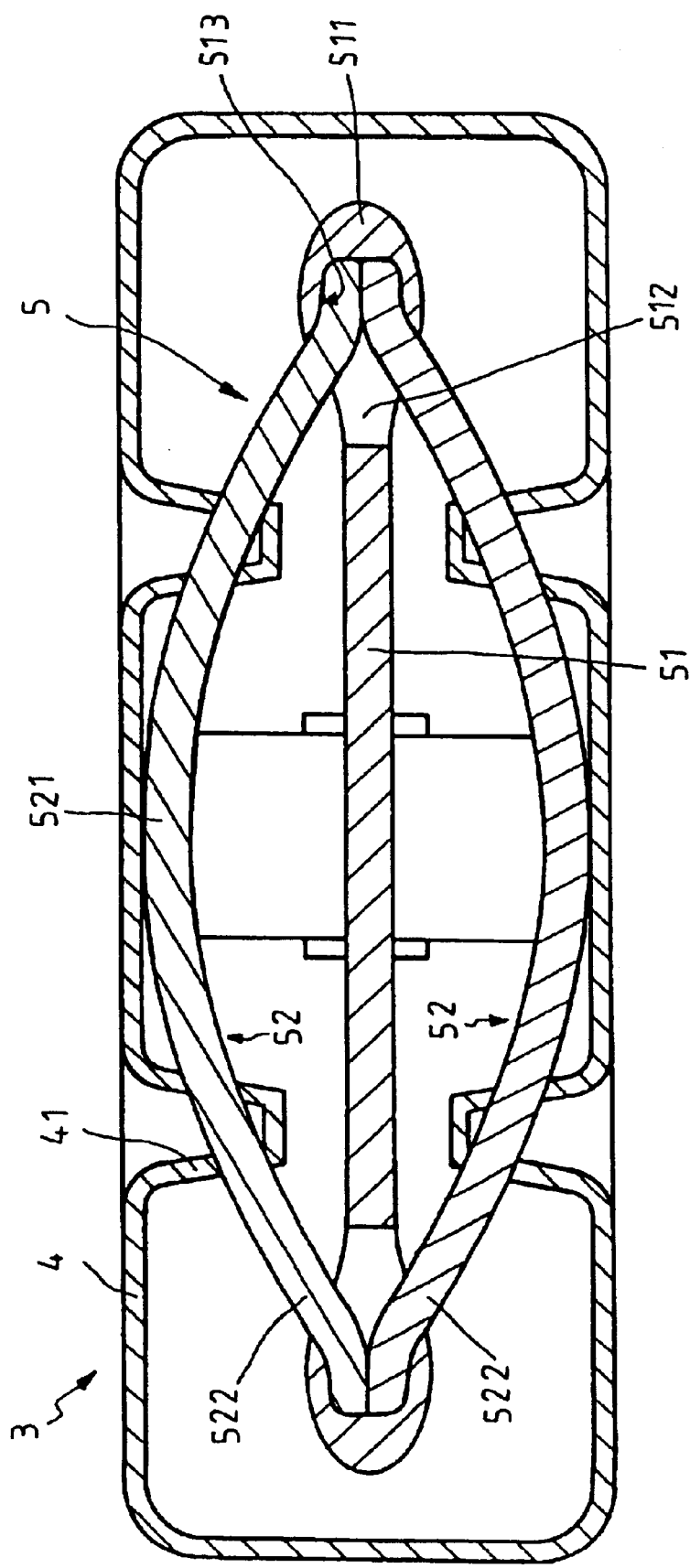
FIG. 6 shows a sectional schematic view of the present invention in combination.
Figure 7:
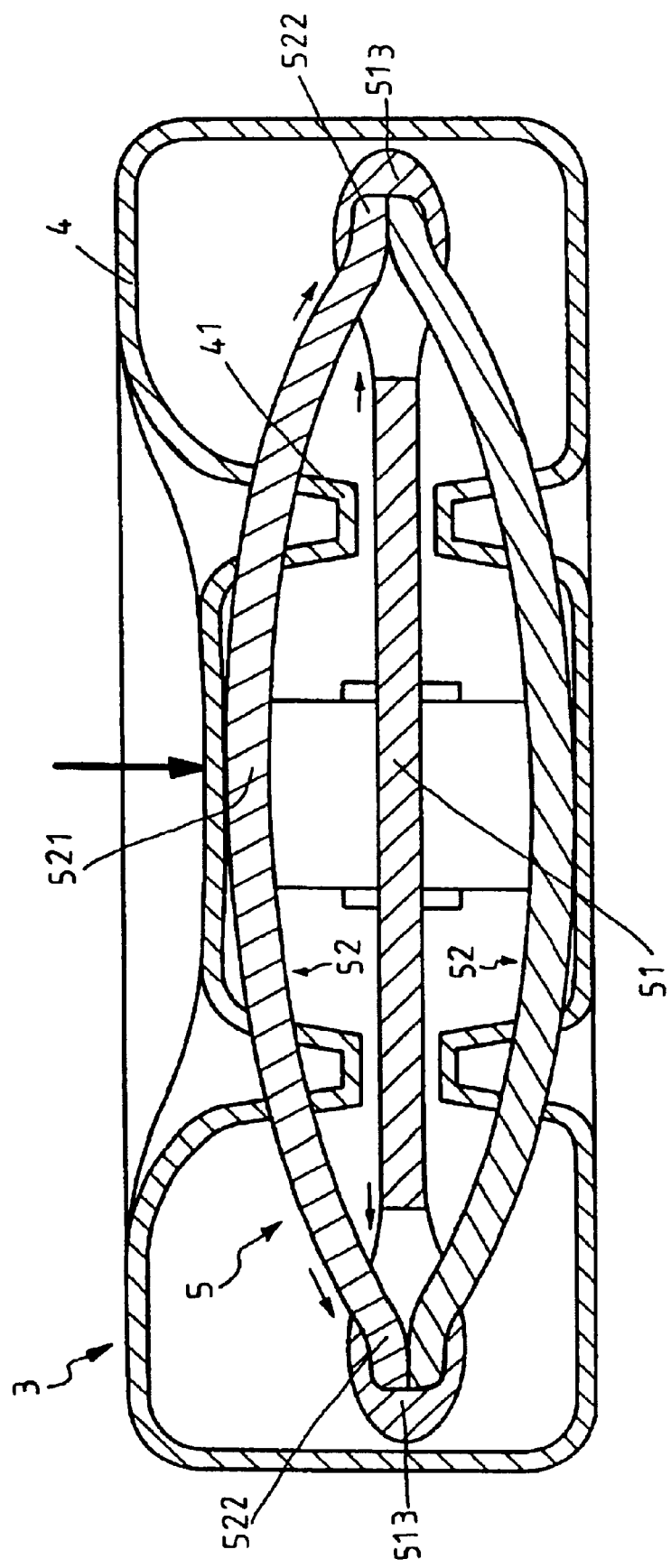
FIG. 7 shows a sectional schematic view of the present invention at work.

As shown in FIGS. 6 and 7, the elastic pad 3 of the present invention further comprises a frame 41 which is encased by the protective covering 4 and is used to confine the elastic member 5. As the elastic pad 3 of the present invention is exerted on by an external force, the first elastic body 51 and the two second elastic bodies 52 of the elastic member 5 are forced to expand, as shown in FIG. 7. As soon as the elastic pad 3 is relieved of the external force, the first elastic body 51 and the two second elastic bodies 52 spring back to their original shapes.

FIG. 6 also shows that each of the slots 512 of the arm 511 of the first elastic body 51 is provided with two retaining surfaces 513 opposite to each other, the retaining surfaces 513 are tightly spaced so as to exert a retaining force against the arms 522 of the second elastic body retained 52 in the slot.

The present invention described above is to be regarded in all respects as being merely illustrative and nonrestrictive. Accordingly, the present invention may be embodied in other specific forms without deviating from the spirit thereof. For example, the first elastic body 51 and the second elastic bodies 52 of the elastic member 5 may have a profile other than the circular one. The present invention is therefore to be limited only by the scopes of the following claims.

What is claimed is:

1. An elastic pad comprising:

a protective covering; and an elastic member encased by said protective covering;

wherein said elastic member comprises:

a first elastic body having a plurality of arms each being provided with a retaining portion at a distal end thereof; and two second elastic bodies symmetrical to each other and sandwiching said first elastic body, each of said second elastic bodies having a plurality of arms respectively corresponding to said plurality of arms of said first elastic body, and each of said arms of said second elastic body being structured such that its distal end is received by said retaining portion of said arm of said first elastic body, and is retained therein.

2. The elastic pad as defined in claim 1, wherein each of said retaining portions of said arms of said first elastic body is formed in the shape of a slot, and each of said slots is structured to receive and retain distal ends of two matching arms of said second elastic body.

3. The elastic pad as defined in claim 2, wherein each of said slots is provided with two retaining surfaces opposite to each other, said two retaining surfaces are tightly spaced so as to exert a retaining force against said arms of said second elastic body retained in said slot.

4. The elastic pad as defined in claim 1 which further comprises a frame encased in a protective covering to confine said first and second elastic bodies.

* * * * *